United States Patent [19]
Hale

[11] Patent Number: 4,776,732
[45] Date of Patent: Oct. 11, 1988

[54] DRILL WITH DISPOSABLE INSERTS
[75] Inventor: Alan A. Hale, Berkhamsted, England
[73] Assignee: Carboloy Inc., Warren, Mich.
[21] Appl. No.: 423,501
[22] Filed: Sep. 27, 1982
[30] Foreign Application Priority Data
Feb. 26, 1982 [GB] United Kingdom ............... 8205711
[51] Int. Cl.$^4$ ............................................. B26D 1/00
[52] U.S. Cl. ................................................ 407/114
[58] Field of Search ............... 407/114; 408/223, 224, 408/713

[56] References Cited
U.S. PATENT DOCUMENTS

| | | |
|---|---|---|
| 3,399,442 | 9/1968 | Jones et al. ......................... 407/114 |
| 3,973,308 | 8/1976 | Lundgren ........................... 407/114 |
| 4,056,871 | 11/1977 | Bator ................................. 407/114 |
| 4,059,363 | 11/1977 | Romagnolo ....................... 407/114 |
| 4,087,192 | 5/1978 | Hertel ................................. 407/114 |
| 4,116,576 | 9/1978 | Gawryk, Sr. ....................... 407/114 |

FOREIGN PATENT DOCUMENTS 2414232 10/1974 Fed. Rep. of Germany ...... 407/114

Primary Examiner—Fred Silverberg
Attorney, Agent, or Firm—Arthur E. Bahr; Ernest F. Chapman

[57] ABSTRACT

An indexable disposable insert having six contiguous edge faces having alternate acute and obtuse angled corners, cutting edges being formed at the junction of at least one of the hexagonal side faces and each of the six contiguous edge faces, the hexagonal side face forming the cutting edge having a chip breaker extending around the face, the chip breaker extending inwardly from each of the cutting edges, and being tapered in plan configuration behind each alternate cutting edge.

9 Claims, 4 Drawing Sheets

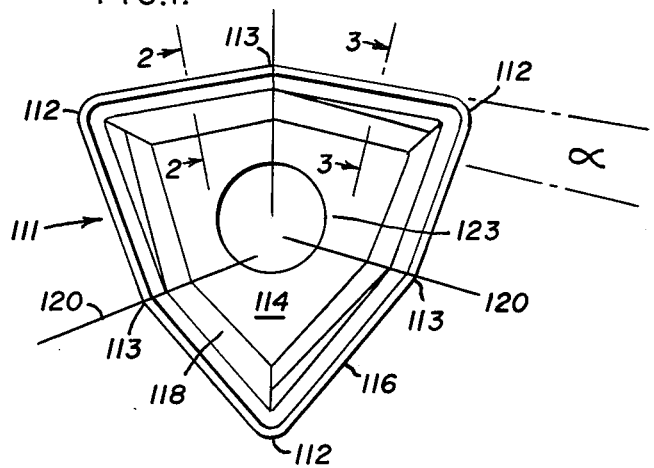
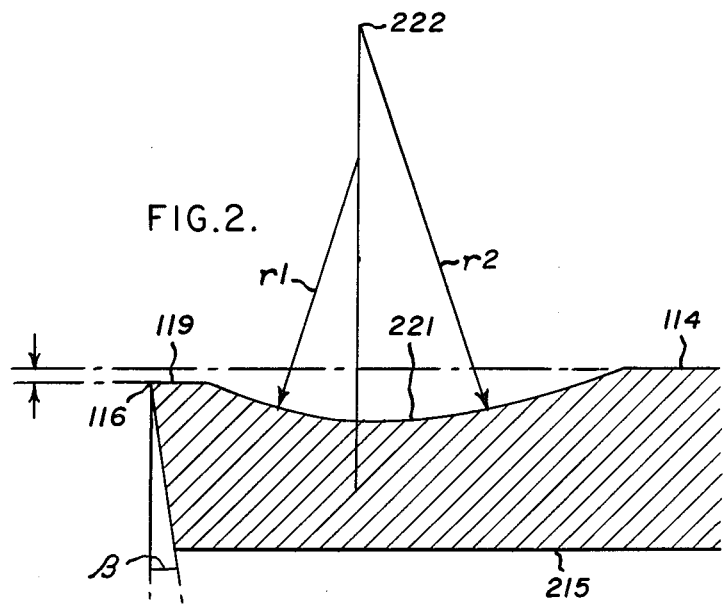
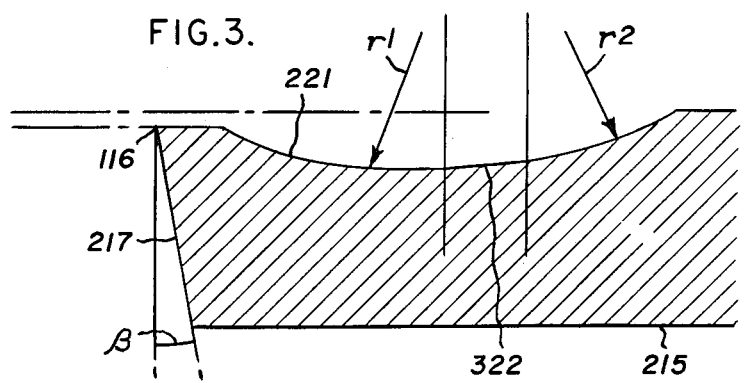

DRILL WITH DISPOSABLE INSERTS

BACKGROUND OF THE INVENTION

The invention is concerned with disposable inserts which can be used for turning, boring and milling. In particular, the invention relates to indexable inserts of hexagonal shape, commonly known as trigonal inserts, with a specific chip breaker form.

Disposable indexable inserts are used in many machine tools. They are generally detachably secured to a holder to be used for cutting etc. When the cutting edge is worn during operation, the insert can be removed from the holder, turned such that a new cutting edge is presented to the workpiece and once again secured to the holder. When all the cutting edges have been used, the insert is replaced.

Hexagonal shaped inserts are used in various machine tools such as turning tools, drilling and grooving tools. A known type of hexagonal shaped insert has alternate acute and obtuse angled corners. When a hexagonally shaped insert of this type is used, the two cutting edges making up the obtuse angle are generally applied to the workpiece. An example of a hexagonally shaped insert is shown in U.K. Patent No. 1,359,238.

Hexagonal shaped inserts of the above type can be used in drilling tools. An example of such a use is shown in U.K. Patent Application No. 2000704A. In this arrangement, cutting bits are arranged in a recess at the end of a drill shank. The hexagonal cutting insert has six cutting edges of equal length of which two are in engagement with the workpiece at each time. The two operative cutting edges are those cutting edges which make up one of the obtuse angles of the hexagonal insert. To improve the cutting of the borer, the operative cutting edges each form approximately the same angle to a line parallel to the turning axis of the drill. The working region of the operative cutting edges of each of the inserts overlap as the drill turns so that material is removed from the bore being drilled.

One of the problems with the above type of insert is that because the radial distance of each of the adjacent cutting edges used in the drilling operation is different, unequal forces are applied during the cutting operation. For example, the outer cutting edge of a particular insert has a greater surface speed than the inner cutting edge for a given turning speed of the drill.

SUMMARY OF THE INVENTION

The present invention provides an indexable disposable insert having six contiguous edge faces having alternate acute and obtuse angled corners, cutting edges being formed at the junction of at least one of the hexagonal side faces and each of the six contiguous edge faces, the hexagonal side face forming the cutting edge having a chip breaker extending around the face, the chip breaker extending inwardly from each of the cutting edges, and being tapered in plan configuration behind each alternate cutting edge.

In this manner, when an insert of the present invention is used in a drill, the forces on the cutting edges on either side of the obtuse angle can be balanced. The variation of the chip breaker for different surface speeds because of different radial distances from the turning axis of the drill is taken into account.

The chip breaker behind each alternate cutting edge generally has a taper up to 12°, preferably in the range of 2° and 10° from the parallel, and preferably about 5°.

The chip breaker width behind adjacent cutting edges along a notional line dividing the obtuse angle is generally but not necessarily the same width. However, the width increases uniformly on one side of the notional line, to form the taper until the chip breaker reaches the acute angled corner of the insert.

The profile of the chip breaker may vary. One example is a single groove behind the cutting edge having a first radius of curvature extending from the cutting edge or a land behind the cutting edge to the lowest point of the groove and a second radius of curvature extending from the lowest point of the groove to the surface of the hexagonal side face. Another type of groove may be a single curved groove. A third type may be a double curved groove and a fourth type may be a flat bottom groove having sloping sides.

The chip breaker may have other shapes apart from a groove. The chip breaker may be a series of spaced apart dimples or depressions in the hexagonal face. The dimples can comprise small circular depressions in the face of the insert equally spaced from one another. and behind the edge of the insert. The dimples may increase in size as they extend away from the obtuse angle such that a tapered chip breaker is formed.

The inserts of this invention are generally of the positive rake type i.e. the angle between the contiguous edge faces and the hexagonal side faces forming the cutting edge is an acute angle. The angle may be up to 12°, less than 90°, this being referred to as the rake angle. The rake used on inserts of the present invention is preferably 7° although this may be any value in the above range. For a positive rake insert, the cutting edges are formed at the junctions of the contiguous edge faces and only one of the hexagonal side faces.

The insert may also be a negative rake insert. The angle between the contiguous edge faces and the hexagonal side faces may be 90°. In this case, cutting edges are formed at the junctions of the contiguous edge faces and each of the hexagonal side faces, making the insert indexable and also reversible.

The chip breaker may be of any well-known cross-section for inserts. Particular examples of groove shape are described below.

The insert may be attached to the tool by known means such as by a lock pin, screw or clamp as is known in the art.

The present invention will be further described, by way of example only, with reference to the accompanying drawings, in which:

BRIEF DESCRIPTION OF THE DRAWINGS

FIG. 1 is a plan view of a hexagonal insert of the present invention showing the chip breaker arrangement;

FIG. 2 is a cross-section of the insert taken along the line 2—2 in FIG. 1;

FIG. 3 is a cross-section of the insert taken along the line 3—3 in FIG. 1;

DETAILED DESCRIPTION OF THE INVENTION

Figure 4:
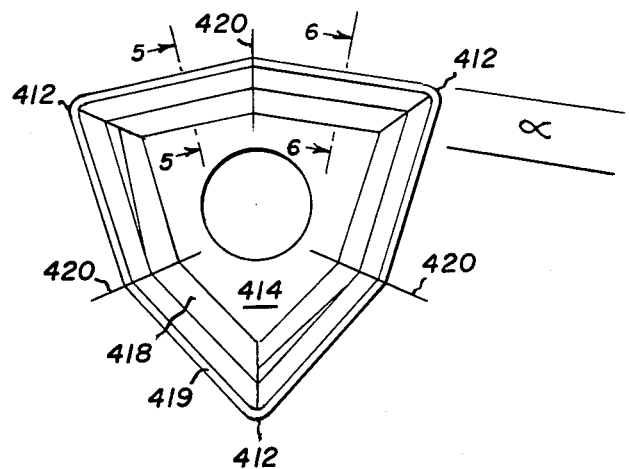
FIG. 4 is a plan view of an alternative hexagonal insert of the present invention showing the chip breaker arrangement.

The general arrangement of the insert 111 of the present invention is shown in FIGS. 1 to 3. In plan view, it is a hexagonally shaped insert having alternate acute angles 112 and obtuse angles 113 on a hexagonal side face 114. As shown in FIGS. 2 and 3, the hexagonal side face 114 has a parallel hexagonal side face 215. The cutting edges 116 are formed at junctions of edge face 217 and hexagonal side faces 114. In a positive raked insert the side faces 217 are raked $\beta$ degrees from the perpendicular to hexagonal side face 114 to provide clearance during drilling. The six edge faces 217 join end to end to form the six contiguous edge faces of the insert 111. Although the corners 112 of the insert 111 are stated to be acute angled, i.e. the extension of the contiguous edge faces if they met at the corner, would be an acute angle, it should be understood that the angle may be rounded as is usual in inserts. Similarly, the obtuse angles may be also rounded.

FIGS. 1, 4, 7 and 10 all show an insert which is used in the conventional direction of turning in a drilling tool, i.e. for use in a clockwise direction. The chip breaking grooves 118, 418, 718 and 1018 are arranged around the periphery of the insert on the hexagonal side face 114 inside a land 119, 419, 719 and 1019 and are inset from the edge face 217, 517, 817 and 1117 (as shown in FIGS. 2 and 3, 5 and 6, 8 and 9 and 11 and 12.

As shown in FIGS. 1, 4, 7 and 10, line 120, 420, 720 and 1020 show the centre line about which the obtuse angles of the hexagonal side faces are arranged. The centre lines 120, 420, 720 and 1020 may bisect the obtuse angle to form equal angles. These angles $\gamma$ and $\delta$ are equal as shown in the drawings. The obtuse angle, the sum of angles $\gamma$ and $\delta$, is generally about 160°, thus angle $\gamma$ and $\delta$ are each 80°. However, the difference between angle $\gamma$ and $\delta$ may vary by up to 8°, such that line 120 is not the bisecting line.

Various alternative profiles of chip breaking grooves are shown in the drawings. Each group is shown in FIGS. 1 to 3, FIGS. 4 to 6, FIGS. 7 to 9 and FIGS. 10 to 12 respectively. The chip breaking grooves will now be described taking each group of drawings in turn.

In FIGS. 1 to 3, the chip breaker groove 118 extends around the hexagonal side faces and is inset from the edge face 217. The cutting edges 116 on either side of an obtuse angle 113 are bisected by notional lines 120. The groove 118 behind the cutting edge on one side of the obtuse angle has a groove width which is substantially uniform in width. This is shown in FIG. 1 as cross-section 2—2. In FIG. 2 a chip breaker groove is shown with a two radii of curvature, a first radius extending from the land 119 behind the cutting edge of the lowest point of the groove and a second radius of curvature extending from the lowest point to the hexagonal side face 114. The part of the chip breaker groove 22 nearest to the cutting edge has a radius of curvature $r^1$ inset into the hexagonal side face 114 which is generally less than the radius of curvature $r^2$ of the chip breaker groove which is further away from the cutting edge 116. The two centres of radius $r^1$ and $r^2$ are generally on the same line 222. The chip breaking groove is preferably divided from the cutting edge by a land 119. The land 119 and the cutting edge may be below the surface of the hexagonal side face 114 by an amount $\epsilon$. Thus for a small depth of cut the removed metal streams across the land 119 and hits the back of the chip breaking groove 221 cutting and breaking the removed metal into chips. When the depth of cut is much greater, the removed metal follows the contours of the chip groove beginning at the front i.e. the small radius and cuts around through the large radius eventually breaking into chips.

On the other side of the notional line 120, the groove has a taper. FIG. 1 shows the groove width gradually increasing, the angle of taper of up to 12°, preferably being 2° to 10° relative to the parallel groove width. The preferred angle of taper is generally about 5°. To accommodate such a taper the bottom of the groove 322 is flat, gradually increasing in width. Thus, as shown in FIG. 3, the centre lines of the two groove radii become separate although the radii of curvature of the grooves remains the same.

The insert can be attached to the tool by means of a screw, lock pin or clamp (not shown) through central hole 123 or by other means well accepted in the art.

Figure 5:
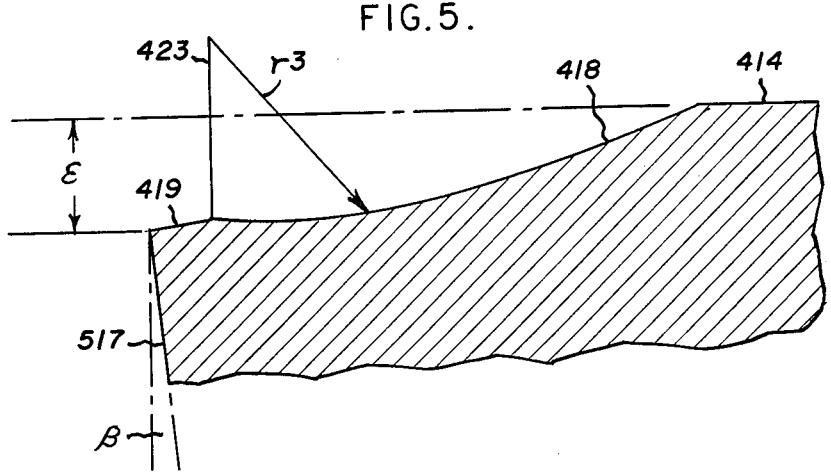
FIG. 5 is a cross-section of the insert taken along the line 5—5 in FIG. 4.
Figure 6:
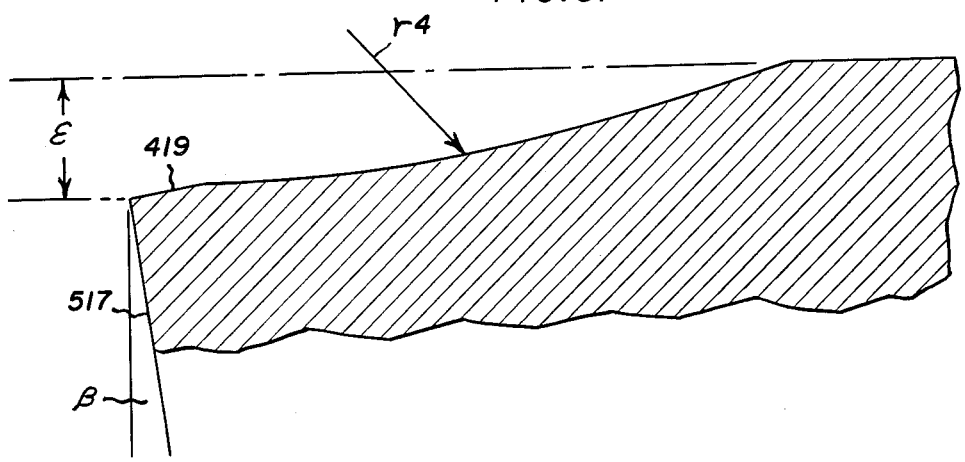
FIG. 6 is a cross-section of the insert taken along the line 6—6 in FIG. 4.

In FIGS. 4, 5 and 6, the grooves 418 extend around the hexagonal side face of the insert 414. The notional line 420 divides the obtuse angle as previously described. In this embodiment, a land 419 extends around the edge of the hexagonal side face 414 of the insert. As shown in the cross-section in FIG. 5, the groove 418 has a radius of curvature $r^3$ centred on a line 423 perpendicular to the general surface of the chip breaker, the line extending from the rear edge of the land 419. The groove width on one side of the notional line 420 remains constant i.e. groove width has a constant radius $r^3$. On the other side of the notional line 120 as shown in the cross-section of FIG. 6, the groove width tapers as previously described. In this embodiment the radius $r^4$ generally increases, such that the width of the groove increases, widens as the groove extends into the corners 412 giving the required angle of taper, $\alpha$.

Figure 7:
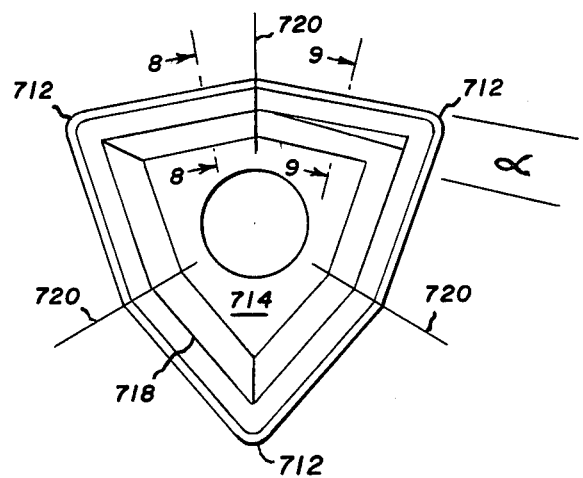
FIG. 7 is a plan view of an alternative hexagonal insert of the present invention showing the chip breaker arrangement.
Figure 8:
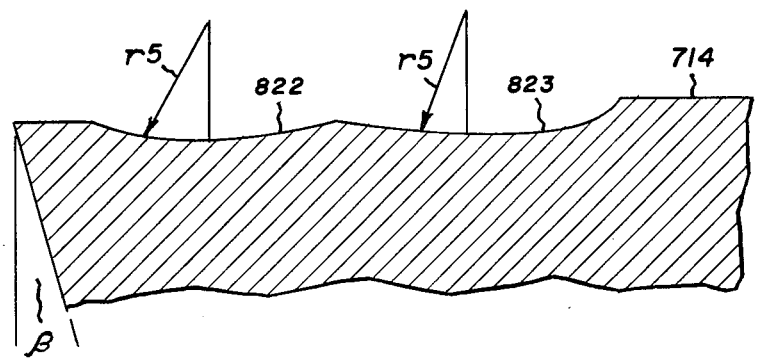
FIG. 8 is a cross-section of the insert taken along the line 8—8 in FIG. 7.
Figure 9:
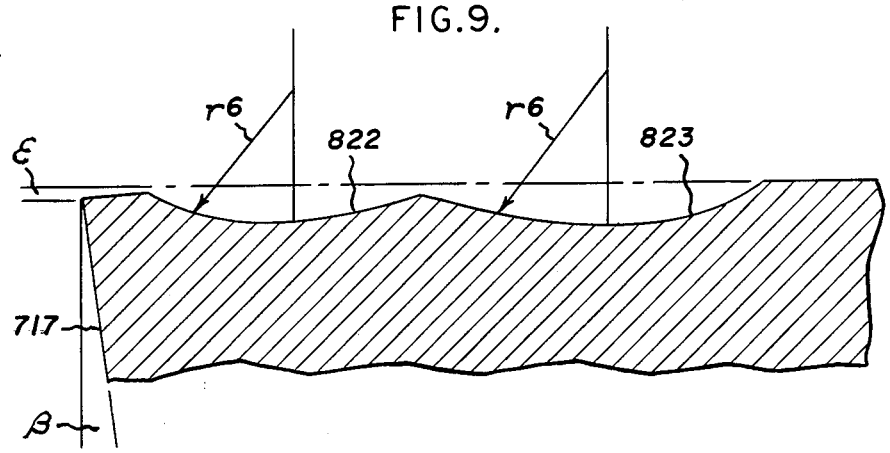
FIG. 9 is a cross-section of the insert taken along the line 9—9 in FIG. 7.

In FIGS. 7, 8 and 9 the chip breaking grooves 718 extend around the hexagonal side face 714. The chip breaking groove 718 is made up of two grooves as shown in FIG. 8, 822, having radii of curvature $r^5$ and $r^6$, respectively, $r^6$ being of greater radius than $r^5$. In this embodiment, heavy cuts form chips in grooves 822, whereas light cuts form chips in grooves 823.

In FIG. 9, each of the radii $r^5$ and $r^6$ increases as each of the grooves 822-823 extends in the corners 712 causing the groove 718 to widen giving the required angle of taper, $\alpha$.

Figure 10:
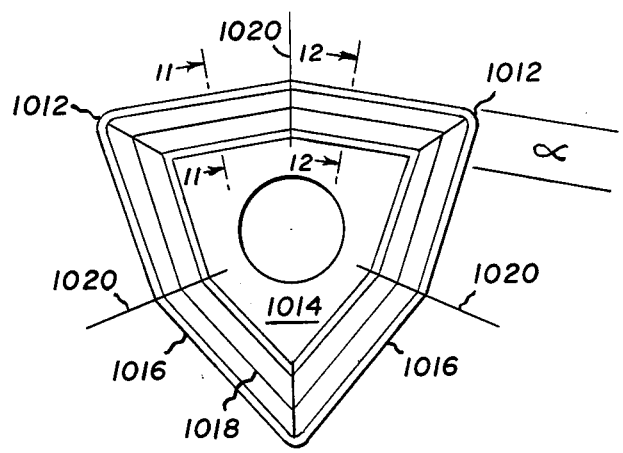
FIG. 10 is a plan view of an alternative insert showing the chip breaker arrangement.
Figure 11:
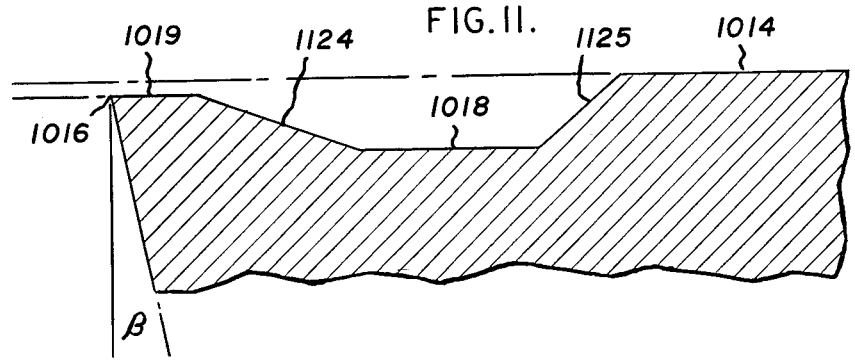
FIG. 11 is a cross-section of the insert taken along the line 11—11 in FIG. 10.
Figure 12:
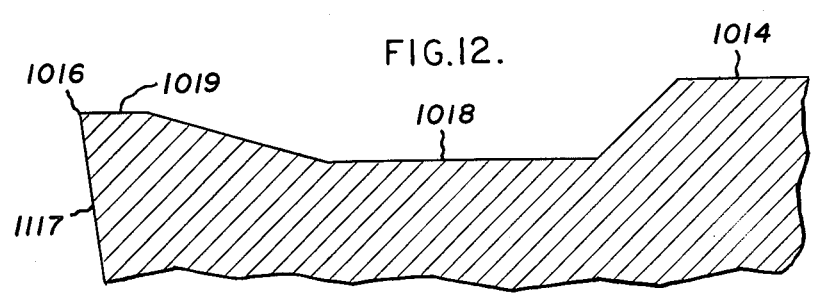
FIG. 12 is a cross-section of the insert taken along the line 12—12 in FIG. 10.

In FIGS. 10 to 12, a trench-like chip breaker groove 1018 extends around and is set back from the cutting edge 1016 and is inset into the hexagonal face 1014. The chip breaking groove is separated from the cutting edge 1016 by a land 1019. As shown in cross-section in FIGS. 11 and 12, the groove 1018 has a flat bottom and sloping side edges 1124 and 1125. As shown in FIG. 12, the groove 1018 is tapered such that the bottom of the groove 1018 increases in width as it extends into the corner 1012, the angle of taper being α as described above.

Although four specific groove shapes have been described, various other chip breakers are suitable for hexagonal inserts of the present invention.

I claim:

1. An indexable disposable insert having six contiguous edge faces of equal length and two hexagonal side faces having alternative acute and obtuse angle corners, cutting edges being formed at the junction of at least one of the hexagonal side faces and each of the six contiguous edge faces, the hexagonal side face forming the cutting edge having a chip breaker extending around the face, the chip breaker extending inwardly from each of the cutting edges, and being tapered in plan configuration only behind each alternate cutting edge.

2. An insert as claimed in claim 1, wherein the tapered chip breaker behind each alternate cutting edge has a taper of between 2° and 10°.

3. An insert as claimed in claim 1, wherein the tapered chip breaker behind each alternate cutting edge has a taper of approximately 5°.

4. An insert as claimed in claim 1, wherein the chip breaker is a chip breaking groove.

5. An insert as claimed in claim 4, wherein the groove profile has a first radius extending from the cutting edge or a land adjacent the cutting edge to the lowest point of the groove and a second larger radius extending from the lowest point of the groove to the surface of the hexagonal side face of the insert.

6. An insert as claimed in claim 4, wherein the groove profile has a single curved groove extending from the land adjacent the cutting edge to the surface of the hexagonal side face of the insert.

7. An insert as claimed in claim 4, wherein the profile of the chip breaking groove is a double curved groove.

8. An insert as claimed in claim 4, wherein the profile of the chip breaking groove is a flat bottomed groove with sloping sides.

9. An insert as claimed in claims 1, 2, 3, 4, 5, 6, 7, or 8, in which the tapered chip breaker behind each alternate cutting edge increases in width as it extends into the acute angled corner.

* * * * *